INVENTOR
EVAN A. FRADENBURGH
BY Jack N. McCarthy
AGENT

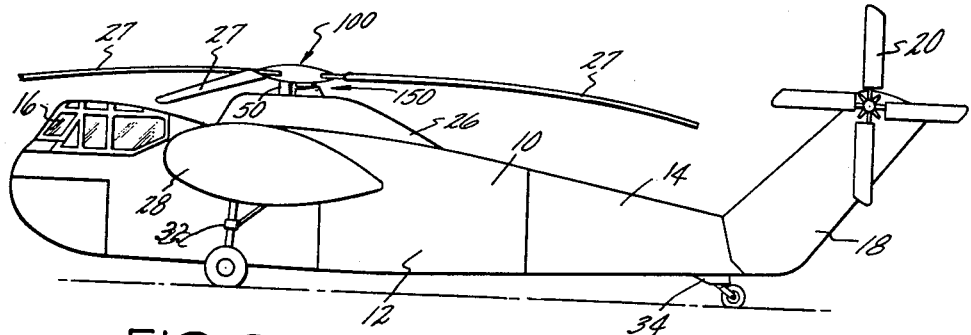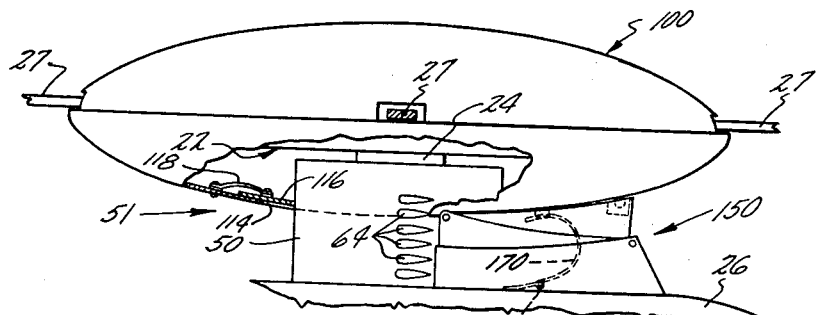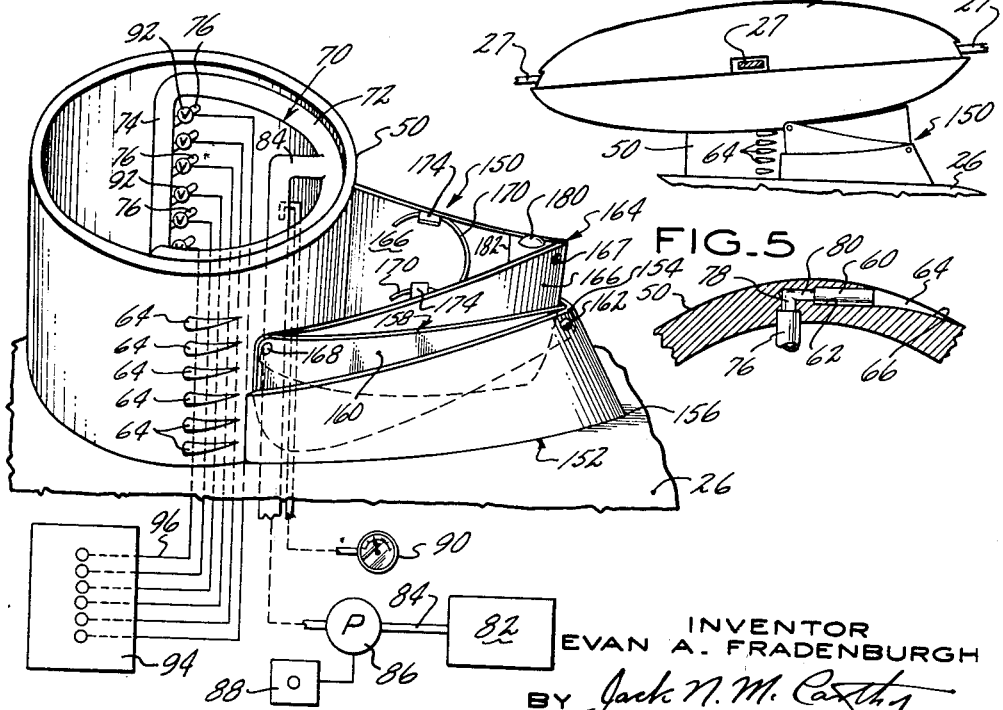
April 28, 1964  E. A. FRADENBURG  3,130,942
BOUNDARY LAYER CONTROL
Filed Feb. 26, 1963  3 Sheets-Sheet 1
FIG.1
FIG.2
FIG.3
FIG.4
FIG.5
INVENTOR
EVAN A. FRADENBURGH
BY Jack N. M. Carthy
AGENT April 28, 1964  E. A. FRADENBURG  3,130,942
BOUNDARY LAYER CONTROL
Filed Feb. 26, 1963                         3 Sheets-Sheet 2

United States Patent Office 3,130,942
Patented Apr. 28, 1964

3,130,942
BOUNDARY LAYER CONTROL
Evan A. Fradenburg, Fairfield, Conn., assignor to United Aircraft Corporation, East Hartford, Conn., a corporation of Delaware
Filed Feb. 26, 1963, Ser. No. 261,183
11 Claims. (Cl. 244—17.11)

This invention relates to a boundary layer control system and is a continuation-in-part of application Serial No. 4,919, for Boundary Layer Control, filed January 27, 1960, now Patent No. 3,101,920 with subject matter added.

An object of this invention is to provide means for reducing the aerodynamic drag force on a rotor head and pylon.

Another object of this invention is to provide means for reducing any interference effect normally experienced between a pylon and rotor head.

A further object of this invention is to provide means for minimizing wake turbulence caused by a rotor head and pylon.

Another object of this invention is to provide a suction opening rearwardly of the rotor head in the pylon.

A further object of this invention is to provide a telescoping splitter vane to provide a proper airflow.

Other objects and advantages will be apparent from the specification and claims, and from the accompanying drawings which illustrate an embodiment of the invention.

FIG. 1 is a side elevation of a helicopter embodying the invention;

FIG. 2 is an enlarged side view of the rotor head fairing showing the control system enclosure cylinder and cylinder telescoping afterbody;

FIG. 3 is a side view showing the rotor head fairing in a position which is tilted forwardly;

FIG. 4 is a perspective view of the control system enclosure cylinder and cylinder telescoping afterbody along with actuating means for controlling air or gas flow, FIG. 5 is a cross-sectional view taken longitudinally through a nozzle of the control system enclosure cylinder;

Figure 6:
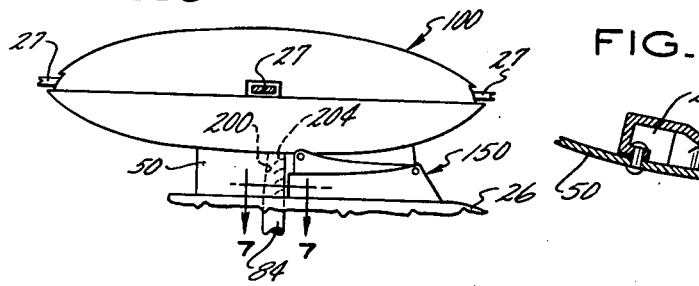
FIG. 6 is a modification of the boundary layer control system shown in FIGS. 1 to 4.

Referring to FIG. 1, this figure shows a helicopter having a fuselage 10 including a cargo or passenger compartment 12 which extends from the nose of the ship aft into the tail cone 14. A pilot's compartment 16 is located above the cargo or passenger compartment. A tail rotor pylon 18 is also provided having the usual antitorque tail rotor 20 mounted thereon for rotation. A main sustaining rotor 22 is mounted on an upright tubular shaft 24 which extends from the main rotor pylon 26 located just aft of the pilot's compartment.

Two engines are provided to drive the main and tail rotors, each mounted in a separate nacelle 28, one of which is shown in FIG. 1. These nacelles are carried by stub wings projecting laterally from opposite sides of the fuselage. The usual main and auxiliary landing gear, 32 and 34, are provided for supporting the ship on the ground.

A rotor head 22 is mounted on a tubular shaft 24 and is shown without actuating means for the blades 27. Rotor heads and actuating systems which may be used are shown in U.S. Patent No. 2,638,994 and U.S. Patent No. 2,672,940. The rotor head fairing 100 is shown and claimed in U.S. Patent No. 3,056,456, filed concurrently with the parent application of this application.

A control system enclosure cylinder 50 extends from the pylon 26 upwardly towards the rotor head. In FIG. 2 this cylinder is shown extending into the fairing 100. A sealing means 51 is provided between the bottom of the fairing and the cylinder 50. This sealing means 51 comprises an annular disk 116 which is placed inside of the rotor head fairing with its inner circumference just fitting around the outer circumference of the control system enclosure cylinder. A plurality of springs 118 are spaced around the opening 114 provided in the lower portion of the rotor head fairing. Each spring has one end fixed to the rotor head fairing while the free end exerts a pressure downwardly on the disk.

A plurality of nozzles 60 are located in the side wall of the cylinder 50 and have their outlets directed rearwardly and substantially tangentially of the cylinder. Each nozzle 60 is positioned in a cylindrical opening 62 drilled in the cylinder wall. The outlet 64 of each opening tapers inwardly at 66. There openings 62 are shown arranged in two vertical lines, one line being located on each side of the cylinder. Each line of jets could be located forwardly or rearwardly of the position shown, but the most efficient location would be slightly forward of the point where flow separation would normally occur.

A manifold system 70 is used to direct air or gas to the nozzles 60. This manifold system comprises a semicircular portion 72 which extends around the inside of the upper portion of cylinder 50. A straight section 74 extends downwardly from each end of the semicircular portion 72. A short conduit 76 extends from each straight portion 74 to each passageway 78 drilled through the inner wall of cylinder 50. Each passageway 78 is connected to its cooperating nozzle inlet by a passageway 80.

An air or gas supply 82 is connected to the semi-circular portion 72 by a conduit 84. A variable output pump 86 is located in said conduit and controlled by a pilot actuated device 88. A flow indicating device 90 indicates to the pilot the total flow passing through conduit 84. The pilot can then control flow as desired.

A valve 92 is located in each short conduit 76 and is moveable by the pilot through an actuating device 94 and interconnecting mechanism 96. This permits the pilot to control the individual flow through any nozzle 60, or combination of nozzles, of either line of nozzles.

A cylinder telescoping afterbody 150 is provided to streamline the cylinder and extends from a point on each side of the cylinder just aft of the outlets 64 of the openings 62 to a midpoint rearwardly of the cylinder.

Afterbody 150 comprises three main fairing sections. The first of these sections, section 152, is fixed with relation to cylinder 50 and pylon 26. Each forward end of this section 152 extends upwardly from the pylon on each side of cylinder 50 to a point approximately half of the distance forming the line of outlets 64. The top of each side of this section extends rearwardly toward a midpoint 154 from its respective front point with each side tapering upwardly. The two sides of the section 152 are fixed where they meet at their rearward end and form a line which extends rearwardly from its top point 154 to its bottom point 156 forming a streamlined fairing. Each side where it meets, pylon 26 is located outboard of a line directly under the top for a purpose to be hereinafter described.

The second section of the afterbody 150, section 158, comprises two side plates 160. Each plate is positioned on the inside of each side of section 152 and extends for substantially its inner length. Each side plate 160 is pivoted at its upper rearward end, at point 162, to its cooperating side of section 152. This arrangement provides for rotation between each plate 160 about the pivot points 162.

The third section of the afterbody 150, section 164, comprises a fairing member having two sides 166 joined at their rearward ends by a pivot point 167. This permits rotation between each side 166 about pivot point 167. These members fit within the V-shape formed by the side plates 160 of the second section of the afterbody 150. This third section 164 has each side 166 pivoted at its forward end to its cooperating side plate 160 at point 168. When the rotor head fairing tilts to the side, the afterbody tilts also. The bottom of each plate 160 and side 166 are permitted movement sideways in view of the outward taper of the sides of section 152.

A spring member 170 is located on each inner side of the afterbody 150 and is fixed at its lower end at 172 to its respective side of the first section 152. Each spring has its other end located against a flange 174 which projects inwardly from the top of each side 166 of the third section 158 of the afterbody 150. The action of spring 170 biases the cylinder telescoping afterbody to its expansive position and maintains the top edge of each of the sides 166 of the third section of the afterbody against the underportion of the fairing 100 in all positions.

A bearing unit is located within the rearward end of the third section of the afterbody 150. This bearing unit comprises a ball member 180 mounted for movement within a socket member 182 fixed in position between plates 166. This member reduces friction between the rotor fairing 100 and the afterbody when there is relative rotation. This bearing unit also reduces friction between these two members when the fairing 100 is tilted with respect to the cylinder 50 and afterbody 150 (see FIG. 3). Other bearing units can be used between the fairing and afterbody if necessary.

Figure 7:
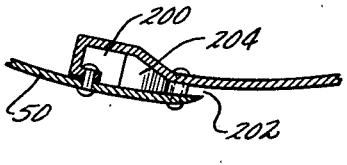
FIG. 7 is an enlarged view taken along the line 7—7 of FIG. 6.

FIGS. 6 and 7 show a modification of the boundary layer control system in which the plurality of nozzles 60 are replaced by a single manifold 200 with a rearwardly directed nozzle shaped slot 202. The conduit 84 directing the air or gas supply is connected directly to the bottom of the manifold 200. The manifold tapers inwardly from its bottom to the top and turning vanes 204 are provided so that an even flow distribution is maintained passing from the slot 202.

Figure 8:
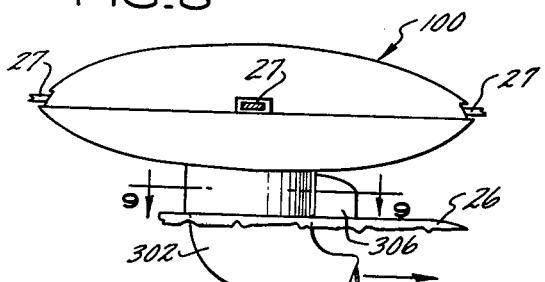
FIG. 8 is another modification of a boundary layer control system.
Figure 9:
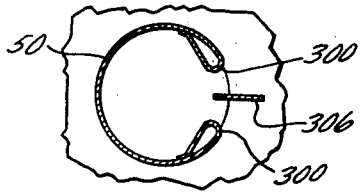
FIG. 9 is a view taken along the line 9—9 of FIG. 8.
Figure 10:
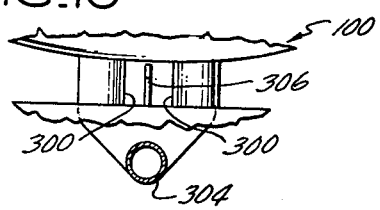
FIG. 10 is a sectional view of the rear end of the modification shown in FIG. 8.

FIGS. 8 to 10 show a modification of the boundary layer control system in which air is drawn in from the rear of the cylinder 50 through an opening 300. The lower end of cylinder 50 is connected by a manifold 302 to a conduit 304. This conduit 304 can be directed to the inlet of a turbine engine or can be connected directly to a pump for creating a suction. A splitter plate 306 extends rearwardly from a point located midway in the opening 300. While this plate has been shown solid with the top cut away to provide for rotor fairing tilt, a simple telescoping splitter vane can be used if it is desired to have the plate 306 extend to a mating position with the fairing. Any actuating control rod or other mechanism which extends downwardly from the rotor head 22 in fairing 100 can be sealed with respect to the manifold 302 or any other portion of the ducting through which they may have to pass. The splitter plate divides the suction flow and establishes a stable symmetrical flow.

Figure 11:
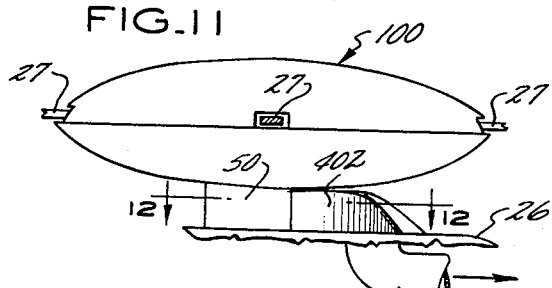
FIG. 11 is another modification of a boundary layer control system.
Figure 12:
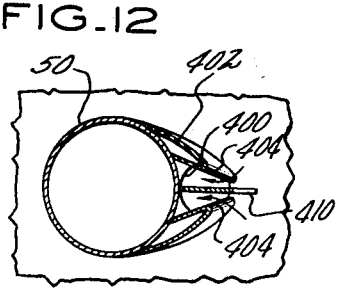
FIG. 12 is a view taken along the line 12—12 of FIG. 11.
Figure 13:
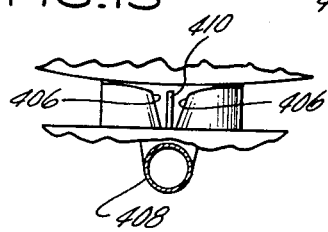
FIG. 13 is a sectional view of the rear end of the modification shown in FIG. 11.

FIGS. 11 to 13 show another modification of the boundary layer control system in which the cylinder 50 remains untouched and an opening 400 is formed in the pylon 26 just rearwardly of the cylinder 50. Side plates 402 are faired to each side of the cylinder 50 and extend rearwardly to a point adjacent the rearmost portion of hole 400. The side plates 402 curve inwardly at 404 and extend forwardly to the cylinder 50. This forms an opening 406 which permits air to pass to the opening 400. Opening 400 is connected to a conduit 408. This conduit can be connected to the inlet of a turbine engine or can be connected to a pump as in the modification shown in FIG. 8. A splitter plate 410 extends rearwardly from the cylinder 50 to a point just rearwardly of the opening formed by the side plates 402 where they curve inwardly.

Figure 14:
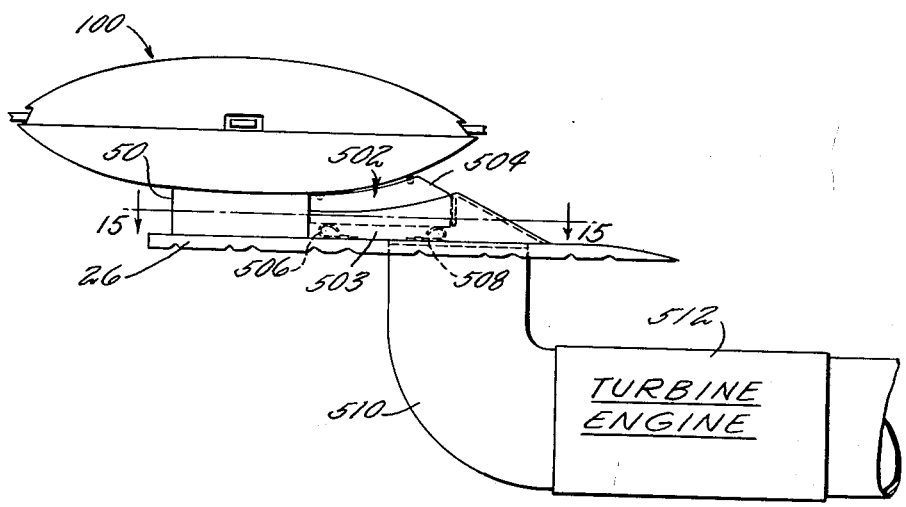
FIG. 14 is another modification of a boundary layer control system.
Figure 15:
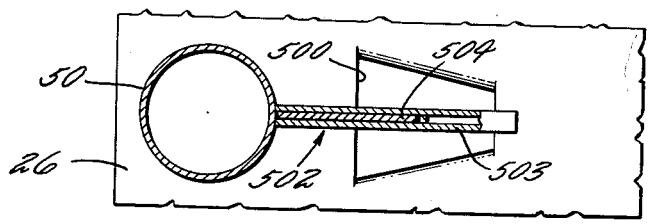
FIG. 15 is a view taken along the line 15—15 of FIG. 14.

FIGURES 14 and 15 show another modification of the boundary layer system in which the cylinder 50 remains unopened and an opening 500 is formed in the top of the pylon 26 rearwardly of the cylinder 50. The opening is positioned so that the outer edge of the rotor head is positioned thereover. A simple telescoping splitter vane 502 is positioned midway in the opening 500 and extends to the cylinder 50 and bottom portion of a fairing 100 on the rotor head. The splitter plate 502 comprises a fixed part 503, having an opening therein, which is fixed in relation to the pylon 26. This fixed part has a second member 504 slidably mounted in its opening to provide for tilting movement of the fairing 100. This member 504 is held against the fairing 100 by springs 506 and 508. Spring 508 bottoms on a strip of material bridging the opening. Rollers on the top of this member engage the fairing 100 to prevent any interference between the rotating fairing and non-rotating splitter vane.

The opening 500 is connected by conduit 510 to the inlet of turbine 512. The outlet of the turbine engine is connected to exhaust. As can be seen in FIG. 15, the opening is isosceles trapezoidal in shape with the wider of the two ends located in the forward position, the sides of the opening are rounded.

It is to be understood that the invention is not limited to the specific description above or to the specific figures, but may be used in other ways without departure from its spirit as defined by the following claims.

I claim:

1. In combination in an aircraft, a rotor head mounted thereon for rotation, an enclosure member extending upwardly from the aircraft towards said rotor head, means directing a flow of air along each side of the enclosure member between the rotor head and aircraft, said directing means including a suction inlet located at the rear of said enclosure.

2. In combination in an aircraft, a rotor head mounted thereon for rotation, an enclosure member extending upwardly from the aircraft towards said rotor head, means directing a flow of air along each side of the enclosure member between the rotor head and aircraft, said directing means including a suction inlet located at the rear of said enclosure, said inlet having a splitter vane dividing the inlet to stabilize the flow through the inlet.

3. In combination in an aircraft, a rotor head mounted thereon for rotation, an enclosure member extending upwardly from the aircraft towards said rotor head, means directing a flow of air along each side of the enclosure member between the rotor head and aircraft, said directing means including a suction inlet located in the rear of said enclosure, and means for creating a suction in said enclosure.

4. In combination in an aircraft, a rotor head mounted thereon for rotation, an enclosure member extending upwardly from the aircraft towards said rotor head, means directing a flow of air along each side of the enclosure member between the rotor head and aircraft, said directing means including a suction inlet located at the rear of said enclosure, and a fairing member extending rearwardly from each side of said enclosure to form upwardly extending sides around said inlet.

5. In combination in an aircraft, a rotor head mounted thereon for rotation, an enclosure member extending upwardly from the aircraft towards said rotor head, means directing a flow of air along each side of the enclosure member between the rotor head and aircraft, said directing means including a suction inlet located at the rear of said enclosure, a fairing member extending rearwardly from each side of said enclosure to form upwardly extending sides around said inlet, and a splitter vane extending rearwardly from said enclosure dividing the area between said fairing members.

6. In combination in an aircraft, a rotor head mounted thereon for rotation, an enclosure member extending upwardly from the aircraft toward said rotor head, a suction inlet located in the top of said aircraft behind said enclosure member, said suction inlet having a splitter vane between the aircraft and said rotor head dividing the inlet to stabilize flow through the inlet.

7. In combination in an aircraft, a rotor head mounted thereon for rotation, an enclosure member extending upwardly from the aircraft toward said rotor head, a suction inlet located in the top of said aircraft behind said enclosure member, said suction inlet having a splitter vane between the aircraft and said rotor head dividing the inlet to stabilize flow through the inlet, a turbine engine located in said aircraft, said turbine engine having an inlet and outlet, and conduit means connecting said suction inlet with said engine inlet.

8. In combination in an aircraft, a rotor head mounted thereon for rotation, a fairing on said rotor head, an enclosure member extending upwardly from the aircraft toward said rotor head, a suction inlet located in the top of said aircraft behind said enclosure member, said suction inlet having a telescoping splitter vane between the aircraft and said fairing dividing the inlet to stabilize flow through the inlet, a turbine engine located in said aircraft, said turbine engine having an inlet and outlet, and conduit means connecting said suction inlet with said engine inlet.

9. In combination in an aircraft, a rotor head mounted thereon for rotation, an enclosure member extending upwardly from the aircraft toward said rotor head, a suction inlet located in the top of said aircraft behind said enclosure member, said inlet having the shape of an isosceles trapezoid with the wider of the two ends being located in the forward position, said suction inlet having a splitter vane between the aircraft and said rotor head dividing the inlet to stabilize flow through the inlet.

10. In combination in an aircraft, a rotor head mounted thereon for rotation, an enclosure member extending upwardly from the aircraft toward said rotor head, a suction inlet located in the top of said aircraft behind said enclosure member, said inlet having the shape of an isosceles trapezoid with the wider of the two ends being located in the forward position, the sides of the opening of equal length having a rounded edge where they meet the aircraft, said suction inlet having a splitter vane between the aircraft and said rotor head dividing the inlet to stabilize flow through the inlet.

11. In combination in an aircraft, a rotor head mounted thereon for rotation, an enclosure member extending upwardly from the aircraft toward said rotor head, a suction inlet located in the top of said aircraft behind said enclosure member, said inlet having the shape of an isosceles trapezoid with the wider of the two ends being located in the forward position, the sides of the opening of equal length having a rounded edge where they meet the aircraft, said opening being located to suck air from the region adjacent the edge of the rotor head, said suction inlet having a splitter vane between the aircraft and said rotor head dividing the inlet to stabilize flow through the inlet.

No references cited.